United States Patent
Ramakrishnan et al.

(10) Patent No.: US 11,047,364 B2
(45) Date of Patent: Jun. 29, 2021

(54) METHOD OF IDENTIFYING A FAULT IN A SYSTEM OF GEARS IN A WIND TURBINE

(71) Applicant: VESTAS WIND SYSTEMS A/S, Aarhus N (DK)

(72) Inventors: Pattabiraman Trichy Ramakrishnan, Chennai (IN); Mallikarjun Narayanpur, Karnataka (IN)

(73) Assignee: VESTAS WIND SYSTEMS A/S, Aarhus N (DK)

(*) Notice: Subject to any disclaimer, the term of this patent is extended or adjusted under 35 U.S.C. 154(b) by 196 days.

(21) Appl. No.: 16/098,547

(22) PCT Filed: May 4, 2017

(86) PCT No.: PCT/DK2017/050135
§ 371 (c)(1),
(2) Date: Nov. 2, 2018

(87) PCT Pub. No.: WO2017/190745
PCT Pub. Date: Nov. 9, 2017

(65) Prior Publication Data
US 2019/0154007 A1     May 23, 2019

(30) Foreign Application Priority Data

May 4, 2016 (DK) ............................ PA201670294

(51) Int. Cl.
*F03D 7/00* (2006.01)
*F03D 17/00* (2016.01)
(Continued)

(52) U.S. Cl.
CPC ............. *F03D 17/00* (2016.05); *F03D 15/00* (2016.05); *G01H 1/003* (2013.01); *G01H 1/16* (2013.01);
(Continued)

(58) Field of Classification Search
None
See application file for complete search history.

(56) References Cited

U.S. PATENT DOCUMENTS 4,872,337 A    10/1989   Watts et al.
8,082,115 B2 *   12/2011   Bechhoefer ........... G01M 13/00
                                                                          702/34
(Continued)

FOREIGN PATENT DOCUMENTS

AU       2015201595 A1    10/2016
CN       102539142 A      7/2012
(Continued)

OTHER PUBLICATIONS

Patent Corporation Treaty International Search Report for Application No. PCT/DK2017/050135 dated Jul. 24, 2017.
(Continued)

*Primary Examiner* — Eldon T Brockman
(74) *Attorney, Agent, or Firm* — Patterson + Sheridan, LLP

(57) ABSTRACT

A method of identifying a fault in a system of gears in a wind turbine is provided. The method determines a first centre harmonic frequency amplitude according to vibrations of the system of gears and determines a plurality of sideband amplitudes of the first centre harmonic frequency amplitude. Further, the method calculates an average sideband amplitude from the plurality of sideband amplitudes and determines a value indicative of damage incurred by the system of gears based upon the first centre harmonic frequency amplitude and the average sideband amplitude. The centre harmonic frequencies may be harmonic tooth mesh frequencies and the value indicative of damage may be a ratio of the centre harmonic frequency amplitude and a difference between the centre harmonic frequency amplitude and the associated average sideband amplitude or vice versa. The (Continued)

method may analyse the value of any ratio obtained and use the ratio values to identify, and monitor the progress of, a fault.

20 Claims, 10 Drawing Sheets

(51) Int. Cl.
  *G01H 1/00* (2006.01)
  *G01H 1/16* (2006.01)
  *G01M 13/021* (2019.01)
  *F03D 15/00* (2016.01)
  *F03D 7/02* (2006.01)
  *F16H 57/02* (2012.01)
  *F03D 15/10* (2016.01)
  *F03D 80/50* (2016.01)

(52) U.S. Cl.
  CPC .............. *G01M 13/021* (2013.01); *F03D 7/02* (2013.01); *F03D 15/10* (2016.05); *F03D 80/50* (2016.05); *F05B 2260/80* (2013.01); *F05B 2270/334* (2013.01); *F16H 2057/02078* (2013.01); *Y02E 10/72* (2013.01)

(56) References Cited

U.S. PATENT DOCUMENTS

| | | | |
|---|---|---|---|
| 8,171,797 B2* | 5/2012 | Hatch ................. | G01M 13/021 73/587 |
| 8,364,424 B2* | 1/2013 | Lou ..................... | F03D 15/00 702/34 |
| 2003/0065482 A1 | 4/2003 | Bechhoefer | |
| 2008/0010039 A1 | 1/2008 | Miyasaka et al. | |
| 2010/0198534 A1 | 8/2010 | Hala et al. | |
| 2011/0125419 A1* | 5/2011 | Bechhoefer ............. | F03D 17/00 702/34 |
| 2012/0029838 A1* | 2/2012 | Hallman ................ | G01H 1/003 702/34 |
| 2012/0073364 A1* | 3/2012 | Hatch .................... | G01H 1/003 73/162 |

FOREIGN PATENT DOCUMENTS

| | | |
|---|---|---|
| CN | 202661241 U | 1/2013 |
| CN | 104236908 A | 12/2014 |
| EP | 1528377 A2 | 5/2005 |
| JP | 5412209 B2 | 2/2014 |
| WO | 2017190745 A1 | 11/2017 |

OTHER PUBLICATIONS

Hong Liu et al: "An explanation of frequency features enabling detection of faults in equally spaced planetary gearbox," Mechanism and Machine Theory, vol. 73, Dec. 6, 2013 (Dec. 6, 2013). pp. 169-183 [Abstract Only] Hong.

Al-Arbi et al: "Remotely gear condition monitoring using traditional signal processing techniques.", Proceedings of Computing and Engineering Annual Researchers' Conference 2009: Jan. 2009 pp. 111-117.

He Guolin et al: "A novel order tracking method for wind turbine planetary gearbox vibration analysis based on discrete spectrum correction technique", Renewable Energy, vol. 87, Oct. 29, 2015 (Oct. 29, 2015), pp. 364-375.

Danish Patent and Trademark Office First Technical Examination for Patent Application No. PA 2016 70294 dated Dec. 22, 2016.

PCT Written Opinion of the International Searching Authority for Application No. PCT/DK2017/050135 dated Jul. 24, 2017.

Chinese Office Action dated Jan. 19, 2020 for Application No. 201780040049.1.

* cited by examiner

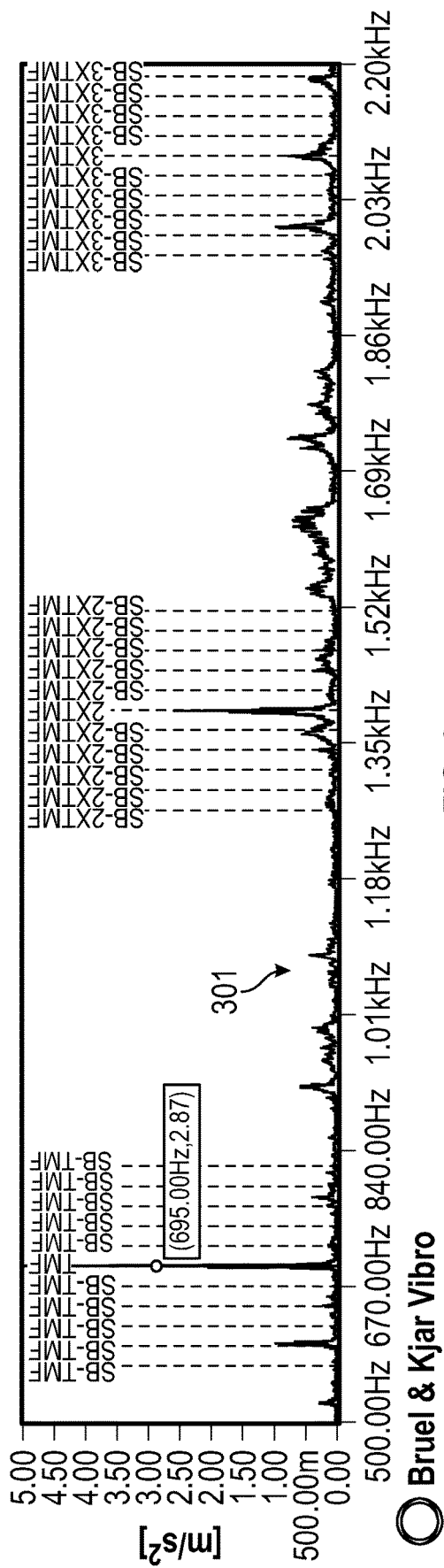
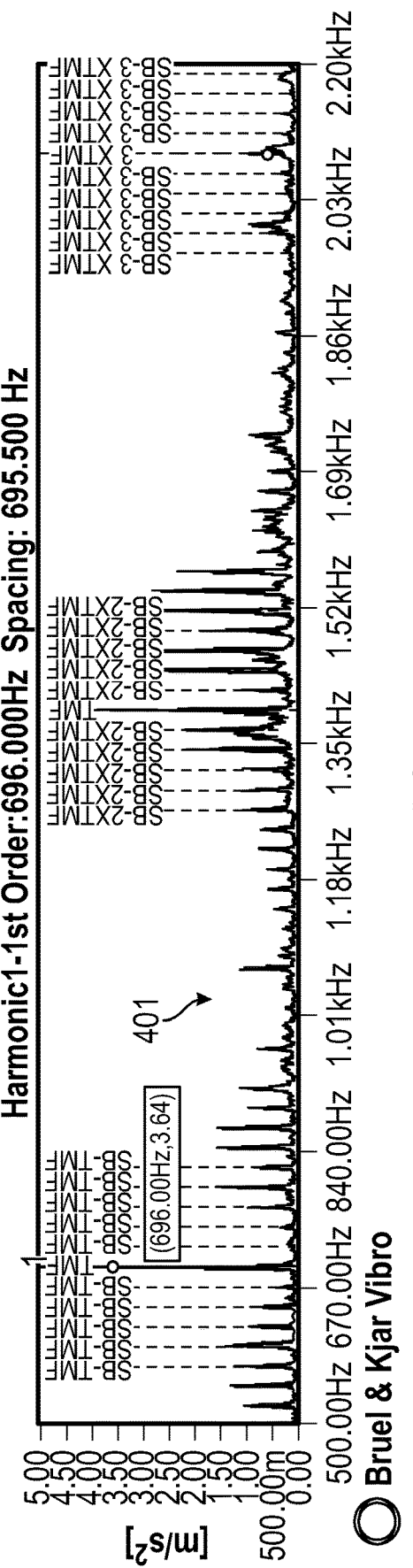
FIG. 3
FIG. 4

METHOD OF IDENTIFYING A FAULT IN A SYSTEM OF GEARS IN A WIND TURBINE

BACKGROUND OF THE INVENTION

This invention relates to the field of identifying faults in systems of gears, and particularly to the field of identifying faults in a system of gears in a wind turbine.

Wind turbines are a source of renewable energy, and many countries have increased their use of these turbines in the effort to reduce their reliance on harmful fossil fuels. Indeed, large arrays of wind turbines, known as wind power plants, are being created across the world as part of a strategy to reduce pollution.

Thus, ensuring the continuous and smooth running of wind turbines is becoming more and more important, as is the need to minimise the down-time of any faulty turbines. However, with the rapidly increasing number of wind turbines in operation this is becoming increasingly difficult.

One common type of fault in a wind turbine are faults within the wind turbine gear box. These faults are notoriously difficult to diagnose due to the complexity of the gearboxes and the low signal to noise ratio. A large noise is produced by the running of the gears compared to the relatively weak signal produced by a small gear defect. Therefore, this type of fault typically results in long down times and is a major issue in wind turbines becoming a viable alternative energy source to fossil fuels.

Various attempts have been made to overcome this problem. For example, in patent document U.S. Pat. No. 8,171, 797B2, a method for assessing the deterioration in a gearbox is disclosed. This method uses data obtained from an operating gearbox and uses this data to provide an indication of deterioration.

However, such methods have not taken into account a true representation of the energy distribution that results from a gear fault. As a result, these methods do not provide an accurate representation of gear progression and may incorrectly diagnose a healthy gearbox as having a fault, or may provide misleading or incorrect diagnoses.

SUMMARY OF THE INVENTION

We have appreciated the need to improve upon the existing systems and methods currently available and accordingly have provided an invention embodiments of which may have benefits including reduced warranty costs, increased machine life and reliability, reduced spare part cost and increase lead time for maintenance and spare planning.

The invention is defined in the independent claims, to which reference is now directed. Preferred features are set out in the dependent claims.

The invention provides a method of identifying a fault in a system of gears in a wind turbine. The method comprises determining a first centre harmonic frequency amplitude according to vibrations of the system of gears and determining a plurality of sideband amplitudes of the first centre harmonic frequency amplitude. Further, the method comprises calculating an average sideband amplitude from the plurality of sideband amplitude. In addition, the method comprises determining a value indicative of damage incurred by the system of gears based upon the first centre harmonic frequency amplitude and the average sideband amplitude.

Such a method is advantageous as the average sideband amplitude gives a true representation of the energy stored in the sidebands. This in turn gives an accurate indication of the nature and severity of the fault, since the more energy contained in the sidebands the greater the modulation of the centre frequency and the more severe the fault. Therefore, the relationship between this quantity and the centre frequency amplitude gives a truer representation of the condition of the gears, and tracking its change is directly proportional to gear fault progression.

Optionally, the method further comprises determining one or more additional centre harmonic frequency amplitude, determining a plurality of sideband amplitudes of each of the additional centre harmonic frequency amplitudes, calculating an average sideband amplitude of each of the additional centre harmonic frequency amplitudes, and determining a value indicative of damage incurred by the system of gears based upon each of the additional centre harmonic frequency amplitude and the associated average sideband amplitude of each additional centre harmonic frequency amplitude. This is advantageous as additional centre harmonic frequency amplitudes and their associated sidebands can provide additional, supplementary information regarding a fault and its progression.

Optionally, the centre harmonic frequency amplitudes are the centre harmonic tooth mesh frequency amplitudes.

Optionally, the system of gears is a multi-stage system of gears, wherein each centre harmonic frequency amplitude is correlated to a mesh between gears. Further, the method optionally comprises determining a fault within a particular mesh of gears within the system of gears based upon the value indicative of damage for a particular centre harmonic frequency. This is advantageous as it allows the controller, or alternatively or in addition, an operator, of the wind turbine or wind park to determine where in the system of gears the fault lies and therefore allows the fault to be addressed efficiently.

Optionally, the first centre harmonic frequency amplitude is at a fundamental harmonic frequency for the system of gears.

Optionally, each of the additional centre harmonic frequency amplitudes is a harmonic of the first frequency amplitude.

Optionally, determining the value comprises calculating a ratio of the centre harmonic frequency amplitude and a difference between the centre harmonic frequency amplitude and the associated average sideband amplitude or vice versa. The ratio is optionally compared to a threshold to identify whether a fault is present in the system of gears. Further, the ratio is optionally repeatedly calculated while the ratio is within the threshold to obtain a plurality of ratio value and, if a ratio value is calculated that is outside, or beyond, the threshold, optionally outputting data indicating that a fault has been identified in the system of gears. This allows the health of the system of gears to be monitored by a system embodying the intention such that when action is need in relation to a fault, a recommendation is issued.

Optionally, a fault is determined within a particular mesh of gears within the system of gears when the ratio value for a particular centre harmonic frequency associated with the particular mesh of gears is beyond the threshold.

Optionally, the method further comprises repeatedly calculating the ratio for a predetermined period of time to obtain a plurality of ratio values.

Optionally, the ratio values are used to track the progression of a fault. The fault is optionally tracked by comparing each successively calculated ratio value with a threshold value. Alternatively, the fault is tracked by comparing each ratio value of the plurality of ratio values with one or more other ratio values of the plurality of ratio values. This is advantageous at it allows the tracking of a reduction in height between the centre frequency amplitude and the average sideband amplitude. As mentioned above, this is advantageous as such tracking is directly proportional to gear fault progression.

Optionally, at least six sideband amplitudes on either side of each central harmonic frequency amplitude are used to calculate the respective average sideband amplitude.

Optionally, the method further comprising controlling the wind turbine based on the value indicative of damage.

Embodiments of the invention also provide a controller for controlling a wind turbine or a wind power plant, the controller being configured to carry out any of the methods described herein. The invention also provides a wind turbine or wind power plant comprising such a controller.

Embodiments of the invention also provide a computer program which when executed on a controller causes it to carry out any of the methods described herein.

BRIEF DESCRIPTION OF THE DRAWINGS

The invention will be described in more detail by way of example with reference to the accompanying drawings, in which:

FIG. 3 shows a fast Fourier transform spectrum of a healthy system of gears according to a first specific implementation of the invention;

FIG. 4 shows a fast Fourier transform spectrum of a faulty system of gears according to a first specific implementation of the invention;

DESCRIPTION OF A PREFERRED EMBODIMENT OF THE INVENTION

The invention may be embodied in a variety of methods and systems for identifying a fault in a system of gears in a wind turbine. The main embodiment described is a controller for implementing a method of identifying a fault in a system of gears in a wind turbine according to the present invention. A system embodying the invention will first be described with reference to FIG. 1. An embodying method implemented by the embodying system will then be described with reference to FIG. 2, before turning to two specific examples providing further details of how the invention may be implemented.

Figure 1:
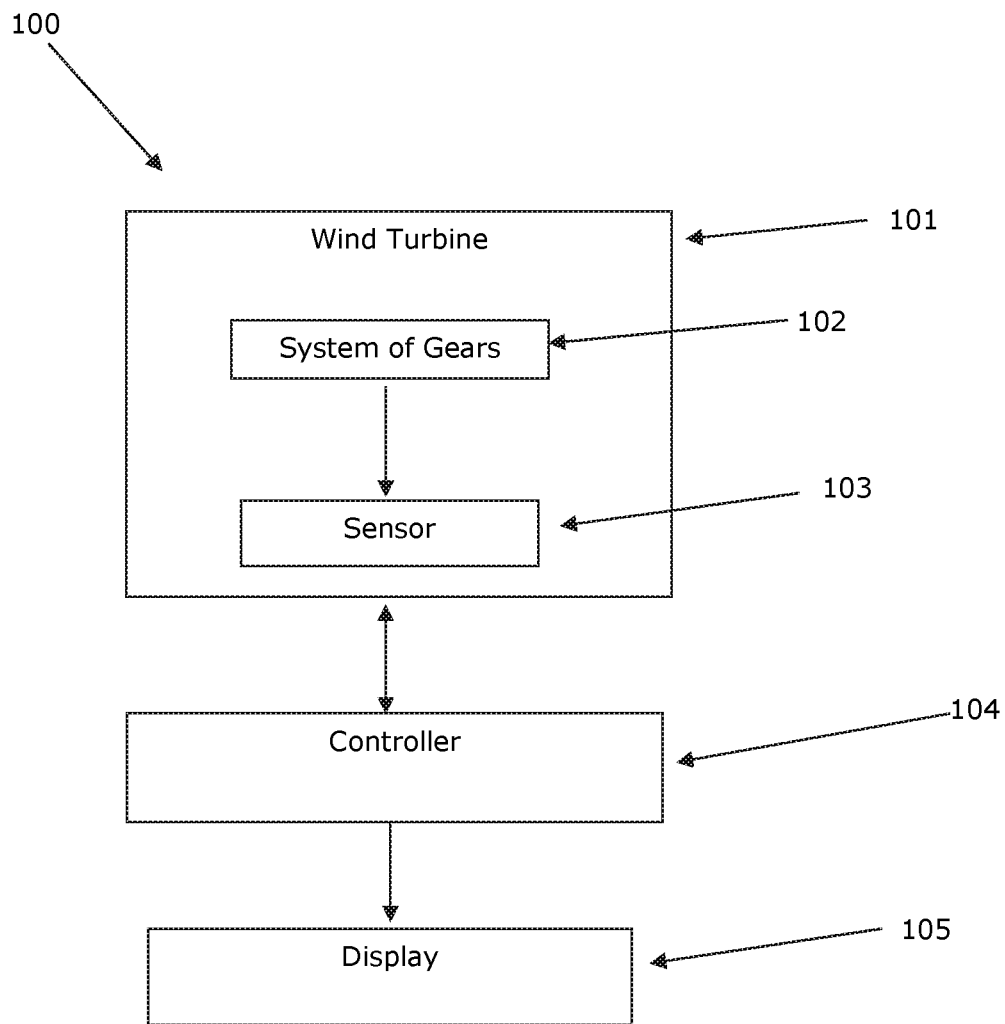
FIG. 1 is a diagram of the main functional components of a system embodying the invention.

FIG. 1 shows a system 100 according to an embodiment of the invention. The system 100 comprises a wind turbine 101, which itself comprises a system of gears 102 and a sensor 103. The general set up and arrangement of the gears within a wind turbine is well known in the art and as such will not be described in detail. However, to aid understanding, it should be noted that systems of gears used in wind turbines are typically multi-stage, for example, a low speed stage, an intermediate speed stage, and a high speed stage, allowing the speed of rotation of the gears to be stepped up and down as appropriate. In the present embodiment a three stage gearbox is used. However, it will be appreciated that the invention is applicable to any arrangement of gears that can conceivably be used within a wind turbine. For example, any two stage, three stage gearbox or other multi-stage gearbox suitable for use in a wind turbine can be used.

The system further comprises a controller 104 and a display 105. The controller 104 and the display 105 are integrated to form a single unit and disposed separately to the wind turbine. The single unit may be a computer which is in communication with the wind turbine 101. Alternatively the single unit may be a tablet or other appropriate device. Further, although the controller and the display are described as being a single unit, other arrangements are possible. For example, system 100 may be entirely integrated into the wind turbine 101, such that the controller 104 and the display 105 are directly attached to the wind turbine 101. Alternatively, the controller may be integrated into the wind turbine but the display is disposed elsewhere, or vice versa, or any further conceivable arrangements.

In response to the rotation of the wind turbine 101, the gears in the system of gears 102 will rotate. The rotation of the gears causes the system of gears 102 to vibrate, producing a vibrational pattern for that system of gears 102. This vibration pattern is dependent on the health of the system of gears 102. If there are no faults present in the system of gears (i.e. it is a healthy system), the teeth of adjacent gears will interlock, or mesh, smoothly and will produce a certain vibrational pattern. If a fault is present, the gear containing the fault will not mesh smoothly with its adjacent gears and this will change the vibrational pattern.

Faults in the system of gears typically relate to damaged gear teeth. For example, a cracked or broken gear tooth will affect how that gear meshes with the gears it interlocks with, which affects the vibrational pattern of the system. However, other types of gear faults are possible as will be apparent to those skilled in the art. It will be appreciated that the present method is applicable to any conceivable gear fault that affects gear meshing.

The sensor 103 is used to measure the vibrations produced by the system of gears, and can be used to collect data on the condition of the system of gears. The sensor data may be provided as part of condition monitoring systems (CMS) data. The sensor 103 may be an accelerometer, detecting acceleration caused by the vibrations, and is mounted on the gear box. It will be appreciated that the sensor may be mounted with respect to the system of gears in any way that allows the sensor to measure the vibrations of the system of gears. For example, in the present embodiment, the sensor may be mounted on an exterior surface of the gear box or the sensor may be mounted on an interior surface of the gear box. Alternatively, the sensor may be mounted on any surface of the wind turbine which enables the vibrational data to be measured. The sensor 103 may be an accelerometer or any other sensor that is appropriate for measuring the vibrations of the system of gears 102.

The vibrational data obtained by the sensor 103 is then collected or received by the controller 104. The data may be collected by the controller 104 using any appropriate data acquisition device (DAU).

The controller 104 then stores the collected vibrational data in memory. The controller may comprise a storage device such as hard disc drive or a solid state drive, in which it may store and retrieve vibrational data. Alternatively, or in addition, the controller may be connected to a server, which the controller can access to both store newly collected vibrational data and also retrieve vibrational data that has already been stored.

Although the controller has been described in the present embodiment as comprising the DAU, it will be appreciated that the DAU may be a separate component which collects the data from the sensor and relays the data to the controller. Alternatively, or in addition, if the controller is connected to a server, the DUA may send the vibrational data directly to the server.

The controller 104 retrieves vibrational data from memory and analyses the data according to the methods as described herein. From the results of the analysis, the controller 104 is able to identify whether a fault is present in the system of gears 102 in the wind turbine 101. The controller 104 may perform the analysis using an algorithm on a MATLAB™ platform. Alternatively, any appropriate software platform for implementing the invention may be used. The results may be written by the controller 104 in any appropriate format, including xl format, and can accordingly be displayed visually, such as by being plotted as one or more graphs. This facilitates the conveyance of the information regarding the fault to an operator of the system 100.

As explained below, the controller 104 can track the progression of a fault in the system of gears by monitoring the vibrational data that it receives from the sensor 103. Further, the controller 104 may send information relating to the fault and its progression, optionally along with recommendations as to any action that should be taken in relation to the fault, to a display 105, which can be viewed by an end user. This allows the end user to easily determine the health of the system of gears at any point in time and whether the fault is such that further action is required.

Figure 2:
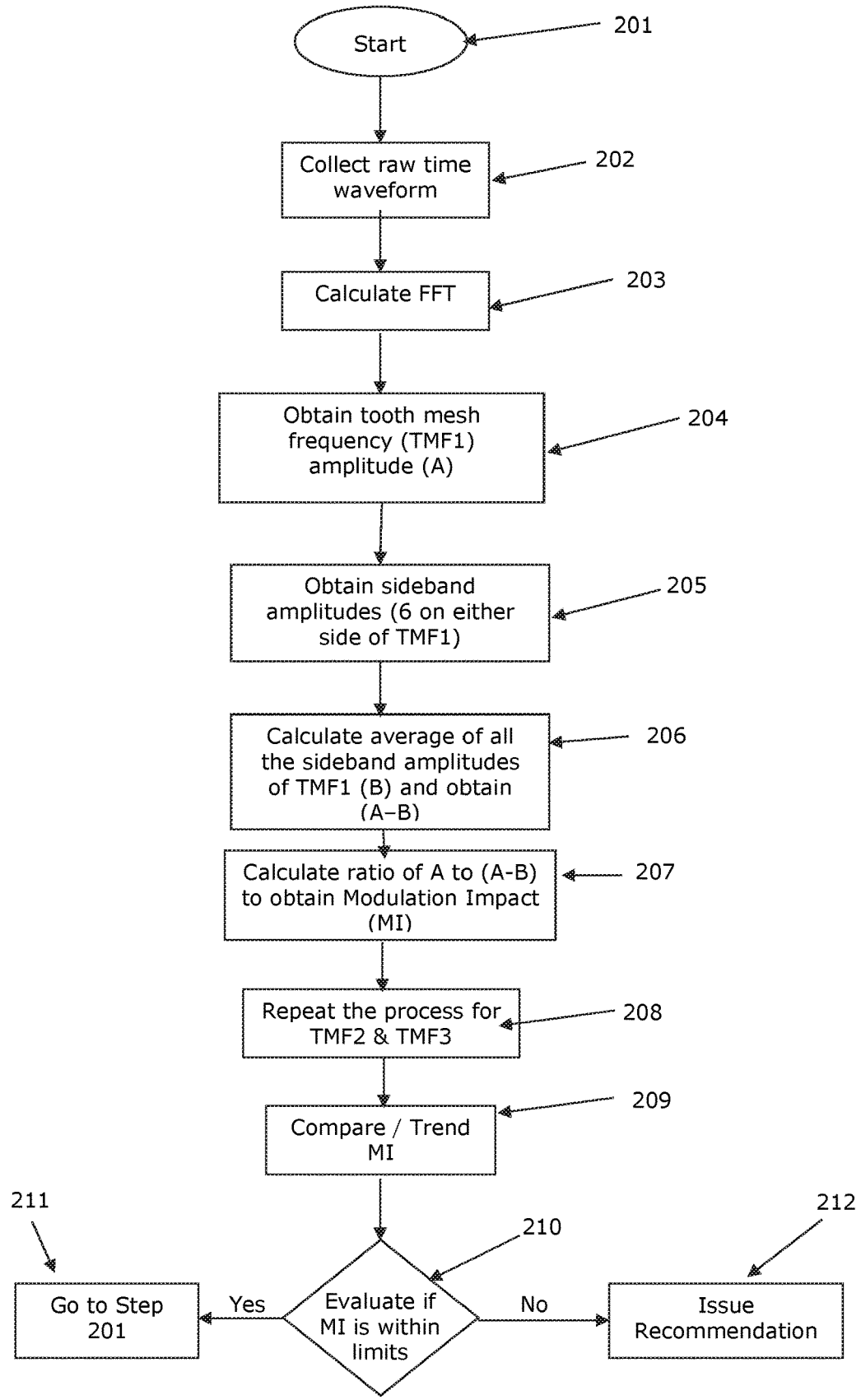
FIG. 2 is a flow diagram of the main functional steps of a method embodying the invention.

FIG. 2 shows an example of a method embodying the present invention of identifying a fault in a system of gears in a wind turbine. In the present embodiment the method is implemented by controller 104 of system 100 shown in FIG. 1. However, systems other than that shown in FIG. 1 may be used to implement the invention.

The process of identifying a fault starts at step 201. At step 202 the controller 104 receives vibrational data from sensor 103 in the form of a raw time waveform. The controller 104 then calculates a fast Fourier transform (FFT) at step 203 converting the raw time waveform into the frequency domain. The general principles behind steps 202 and 203 are both well known in the art and as such will not be described further.

The controller 104 then analyses the FFT data and obtains a first centre harmonic frequency amplitude according to the measured vibrations of the system of gears at step 204. This first centre harmonic frequency amplitude is a fundamental tooth mesh frequency amplitude. Each gear mesh in the system of gears 102 has a fundamental tooth mesh frequency (TMF1), which represents the frequency at which the teeth of interlocking gears come together, i.e. the number of teeth multiplied by shaft speed. As such, the controller may obtain a specific amplitude in relation to a particular gear mesh, allowing for the system to monitor faults in relation to a particular stage of the system of gears 102, i.e. the frequency at which an amplitude is measured is indicative of a particular mesh that is responsible for producing that amplitude.

Any amplitude obtained by controller 104 represents an acceleration of the vibrations measured by the sensor. At the tooth mesh frequency of a particular mesh in the system of gears, there will generally be a spike in the measured vibration acceleration. As the tooth mesh frequency is a known quantity, the controller can directly look to this frequency and obtain the spike in the acceleration. The value of the acceleration obtained by the controller 104 is the tooth mesh frequency amplitude for the mesh. Because the tooth mesh frequency is a known quantity, the frequency peaks (including harmonics) can be associated with the particular gear mesh responsible for generating said peaks.

Further, each fundamental tooth mesh frequency has higher harmonics associated with it (TMF2, TMF3, etc.). These higher harmonics may be monitored in addition to the fundamental frequency as they can provide additional, supplementary information regarding a fault and its progression. In addition, for particular types of faults, any one of these higher harmonics may be used to identify and track the progression of a fault instead of the TMF1 amplitude. This is because, for certain types of faults, a particular harmonic may be more appropriate to monitor than other harmonics. It should be understood that these higher harmonics of the fundamental tooth mesh frequency all relate to the particular gear mesh that the fundamental frequency is associated with; these centre harmonic frequencies are a set of harmonic frequencies that relate to a particular gear mesh.

Further, it should be appreciated that the controller 104 may obtain vibrational data from more than one gear mesh of the system of gears. Thus, the controller can obtain more than one set of harmonic frequencies, with each set being associated with a different gear mesh. Therefore, the controller 104 is not limited to monitoring a single gear mesh. Indeed, the controller 104 may monitor the health of multiple gear meshes by performing the analysis as described below on multiple sets of harmonic frequencies. As a result, if more than one fault is present across more than one gear mesh, the controller 104 can identify and track the progression of one of these faults, or two or more of these faults simultaneously.

Although the present embodiment has been described in relation to tooth mesh frequency amplitudes, it will be appreciated that other appropriate harmonic frequency amplitudes may be used. For example, the rotational frequency or other appropriate quantity obtained by the CMS data may be used.

Once the first centre harmonic frequency amplitude has been obtained at step 204, the controller 104 determines a plurality of sideband amplitudes of the TMF1 amplitude at step 205. These sidebands are a result of a modulation of the first centre harmonic frequency due to imperfections in the gears. In other words, sidebands develop around a centre frequency as a result of the modulation of that centre frequency. This modulation is itself a result of mesh imperfections and the number of sidebands and their amplitudes depend on the particular imperfection. If the system of gears 102 is healthy and the gears are meshing efficiently, the sideband amplitudes will be small compared to the centre amplitude, as there will be little modulation of the centre amplitude. If a fault is present and the gears are not meshing correctly, there will be a greater modulation of the centre frequency and the amplitudes of the sidebands relative to the amplitude of centre frequency will increase.

There is typically a plurality of sideband amplitudes arranged at evenly spaced frequencies on either side of the centre frequency, with each sideband amplitude containing some information regarding the modulation of the centre frequency. In the present embodiment, the first six sideband amplitudes on either side of the centre frequency are calculated at step 205. This number has been found, experimentally, to provide the optimum results for identifying and tracking the progression of a fault. However, it will be appreciated that more or fewer sidebands could be used. It will also be appreciated that it is not necessary to use an equal number of sidebands on either side of the centre frequency. For example, 12 sidebands could be obtained on one side of the centre frequency and none on the other side.

At step 206 the controller 104 calculates an average sideband amplitude of the 12 sideband amplitudes and then computes the difference between the first centre frequency amplitude and the average sideband amplitude, i.e. subtracts the value of the average sideband amplitude from the value of the centre frequency amplitude.

Once the difference between fundamental tooth mesh frequency amplitude and the average sideband amplitude of the fundamental tooth mesh frequency amplitude has been calculated by the controller 104, the controller determines a value indicative of damage incurred by the system of gears based upon the first centre harmonic frequency amplitude and the average sideband amplitude at step 207. In the present embodiment, this value is a ratio of the fundamental tooth mesh frequency amplitude and the difference between the fundamental tooth mesh frequency amplitude and the average sideband amplitude, which is referred to from here on out as the "Modulation Impact", (MI).

As discussed above, this process may optionally be repeated for further harmonics (e.g. TMF2, TMF3 etc.), as indicated by step 208 of the figure.

At steps 209-212, the controller 104 analyses the MI, identifies whether a fault is present in the system of gears 102, and determines whether to issue a recommendation based on the analysed data.

As discussed above, if a fault is present, the amplitude of the sidebands is greater relative to the amplitude of the centre frequency than if a fault is not present. Thus, the smaller the value of the MI the healthier the system of gears 102 are, and conversely, the larger the MI the more severe the fault. Therefore, at step 209, the controller 104 may compare the MI with a threshold value. At step 210, the controller, may evaluate whether the MI is above or below the threshold value. If the MI is above the threshold, the fault is severe and action is required (for example, the installation of a new gear), and the controller may issue a recommendation at step 212. This recommendation is sent to display 105 to be viewed by an end user. Correspondingly, if the MI is below the threshold, the fault is not severe and the controller restarts the process at step 211.

The controller may then repeat the process until the threshold is reached, calculating a plurality of MI values. The process may be repeated at intervals, and may in particular be repeated periodically. The plurality of MI values can be compared at step 209, and any change in the values can be monitored. In this way, the progression of a fault may be continually monitored by the controller. This is done until the fault reaches a point where action is required. At which point a recommendation may be issued. The recommendation may indicate where in the system of gears the fault lies, what action is required, or provide any information that may be useful in addressing the fault. As described above, the values may be written in an xl format and plotted accordingly. Thus, the controller may produce graphs which clearly show the progression of a fault.

The recommendation may be output to display 105, for an operator to view, along with any graphs or additional information that may be useful to the operator in addressing the fault.

Thus, a method of identifying a fault in a system of gears in a wind turbine is provided that can accurately identify faults and track their progression.

Variations of features of the embodiment are possible. For example, the value indicative of damage incurred by the system of gears does not have to be the Modulation Impact as described above. The MI may be defined to be equal to the inverse of the MI described above. Alternatively, the value may not be a ratio, it may be a difference between the quantities, or any other mathematical operation that is suitable as a value indicative of damage incurred by the system of gears.

Further, it is not necessary for the controller to compare the calculated values to a threshold or issue a recommendation. For example, the Modulation Impact values calculated by the controller may simply be output to a display as they are calculated. The operator may then analyse the values and determine if any action is needed in relation to a fault. Alternatively, or in addition, the controller may compare MI values and track the change in the MI values over time. These changes may then be output to a display. Alternatively, or in addition, these changes may be compared to a threshold value and when the threshold is exceeded a recommendation is output. The value indicative of damage incurred by the system of gears may be used by the controller in any other appropriate way to identify a fault in a system of gears in a wind turbine.

In addition to the above description of the present invention, two specific examples of how the invention may be implemented will now be provided.

The Modulation Impact method for gear health condition assessment is a condition monitoring technique, which can be implemented by running a Matlab™ script for signal processing the received *.UFF data (i.e. the CMS data) and the corresponding results. The Modulation Impact, i.e. the relationship between the height of the TMF amplitude peak and the height of the average of the sideband amplitudes (e.g. six on either side of the TMF peak), will provide a guide to gear condition assessment. The results may be automatically output by being written into an output spreadsheet or similar.

The aim of the method is to compare the amplitude level of peaks of the sidebands of the tooth mesh frequency, which equals the number of teeth multiplied by shaft speed, to the level of the tooth mesh frequency. The reduction in height between the TMF amplitude and the average of the sideband amplitudes is a direct indicator of condition of the gears.

Specific Example 1: Broken High Speed (HS) Pinion Tooth in a 3 MW Gearbox

An example of the invention will now be described in relation to tests performed with a 3 MW three-stage gearbox, having two planetary and one parallel stage with ratio 1:112.63 (Step—up). The nominal high speed stage (HSS) speed is 1450 RPM and nominal torque at HSS is 34 kNm. High speed pinion tooth flank failure occurred during the test.

TABLE 1

Summary of the Gearbox shaft speeds and TMF of 3 MW gearbox

| Description | No of Teeth | RPM | RPS (Hz) | Stage |
|---|---|---|---|---|
| Carrier (Input) | — | 13.24 | 0.22 | Low Speed |
| Ring Gear (Stationary) | 93 | 0.00 | 0.00 | Planetary stage (LSP) |
| Planet | 35 | −35.17 | −0.59 (opposite direction) | |
| Sun Pinion (Output) | 23 | 66.76 | 1.11 | |
| Ring Gear (Stationary) | 118 | 0.00 | 0.00 | Intermediate Speed |
| Planet | 47 | −167.62 | −2.79 | Planetary |
| Sun Pinion (Output) | 23 | 409.30 | 6.82 | stage (ISP) |
| Gear Wheel | 102 | 409.30 | 6.82 | High Speed |
| Output Pinion | 28 | 1491.01 | 24.85 | stage (HS) |
| Gear Ratio of LSP | — | 5.0435 | | |
| Gear Ratio of ISP | — | 6.1304 | | |
| Gear Ratio of HS | — | 3.6428 | | |
| TMF and its harmonics | LSP in Hz | ISP in Hz | HS in Hz | |
| 1XTMF | 20.5186 | 131.3036 | 695.8028 | |
| 2XTMF | 41.0372 | 262.6073 | 1391.6057 | |
| 3XTMF | 61.5558 | 393.9109 | 2087.4085 | |

Tooth mesh frequency (TMF) and shaft speeds of all the three stages are presented in Table 1 and are referred to in this section. The significance of MI of a healthy and faulty gear mesh due to a broken gear tooth is explained quantitatively using relevant trend plots in this section.

FIG. 3 shows, a FFT spectrum 301 with a frequency range of 500 to 2200 Hz and resolution of 0.5 Hz, for a healthy gear. Sideband energy levels are present around each of the 1×, 2× & 3×TMF amplitudes (i.e. the TMF1, TMF2 and TMF3 frequencies). However, as this is the spectrum for a healthy gear, these sidebands are small.

A time waveform of a healthy gear would have no periodic impact spikes. A Crest Factor (CF) value, which is the ratio of peak acceleration over RMS acceleration, was also calculated during testing to provide an indication of a healthy gearbox, as a way of tracking damage and confirming that damage incurred by the system of gears can indeed be determined based upon the first centre harmonic frequency amplitude and the average sideband amplitude. For example, the Crest Factor for a healthy gear mesh during testing in this example was 4.31.

FIG. 4 shows a FFT Spectrum 401 of a faulty gear mesh. The FFT spectrum 401 has sideband energy levels around 1× & 2×TMF of the HS stage that are significantly higher than those shown for FIG. 3.

The presence and spacing of the sidebands around 1× and 2×TMF in the spectra indicate that the sideband modulation is occurring once per turn of the high speed shaft. Also, the fact that the 1× and 2× centre mesh frequencies belong to the HS gear mesh indicates that the damage causing the modulation passes through that mesh. This can manifest itself as a change, and particularly an increase, in the MI value of any one of the TMF amplitudes for that particular mesh. The particular TMF amplitude or amplitudes that display increased MI values are determined by the nature of the fault. For example, for a first type of fault, the MI relating to TMF1 may display a clear increase in value. For a second fault, it may be TMF2 that displays a clear increase in the MI, or alternatively both TMF1 and TMF2 may display a clear increase in their respective MI values. However, as this set of harmonic frequencies (TMF1, TMF2, etc.) all relate to a particular gear mesh (in this case the HS gear mesh), an increase in the MI relating to any one of these centre harmonic frequencies indicates that there is damage to the HS pinion in this gearbox.

A time waveform of a faulty gear mesh may have a CF value which indicates that a fault is present in the system of gears. For example, during testing in this example, the CF value for a faulty gear mesh was 5.933. This is a significant increase in CF compared with healthy gear mesh CF. There is also an increase in MI, which is evidence of the impact spikes present in the time waveform. The time wave form for a faulty gear mesh may also show impact spikes once per revolution of the high speed shaft at, in this example, 24.83 Hz. The periodic impacts may be clearly visible throughout the time waveform window.

A trend plot, such as a plot of frequency (Hz) and vibration acceleration amplitude (m/s$^2$) updated over time, can clearly reveal the growth of number of sidebands around 1× & 2×TMF over a period of time from a healthy to a faulty gear mesh. The amplitude of the sidebands and their harmonics on such a plot are also observed to be increased for damaged gears. Such plots can quantitatively indicate the increase in MI proportionate to gear fault progression from gear defect initiation to failure.

Figure 5:
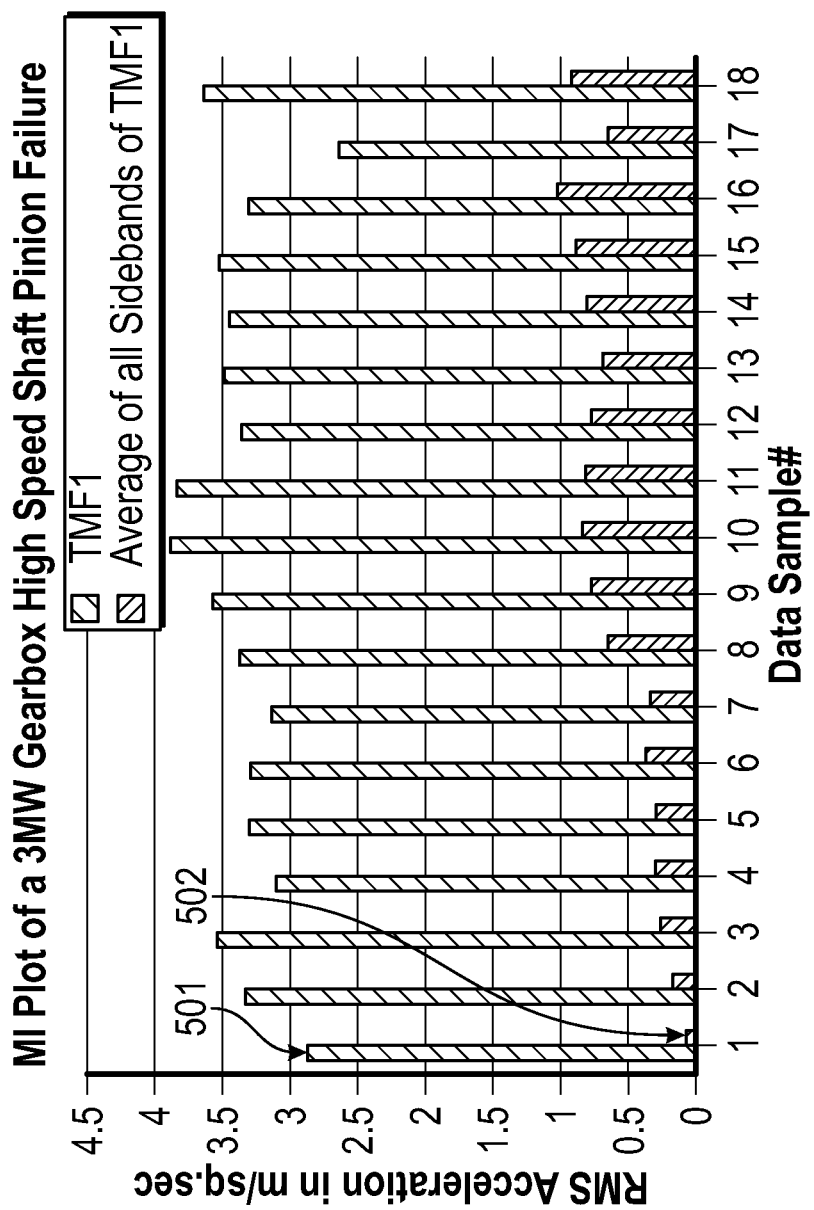
FIG. 5 shows an MI (Modulation Impact) trend plot for first centre harmonic frequency amplitude of a system of gears according to a first specific implementation of the invention.
Figure 6:
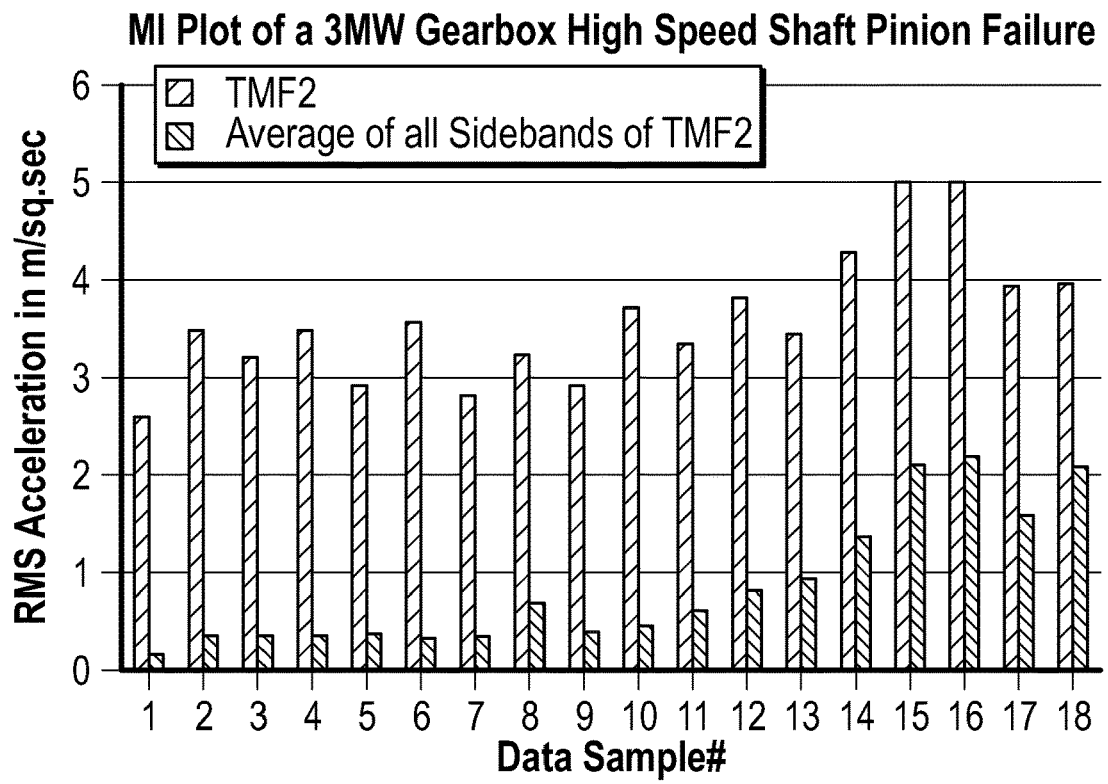
FIG. 6 shows an MI trend plot for a second centre harmonic frequency amplitude of a system of gears according to a first specific implementation of the invention.
Figure 7:
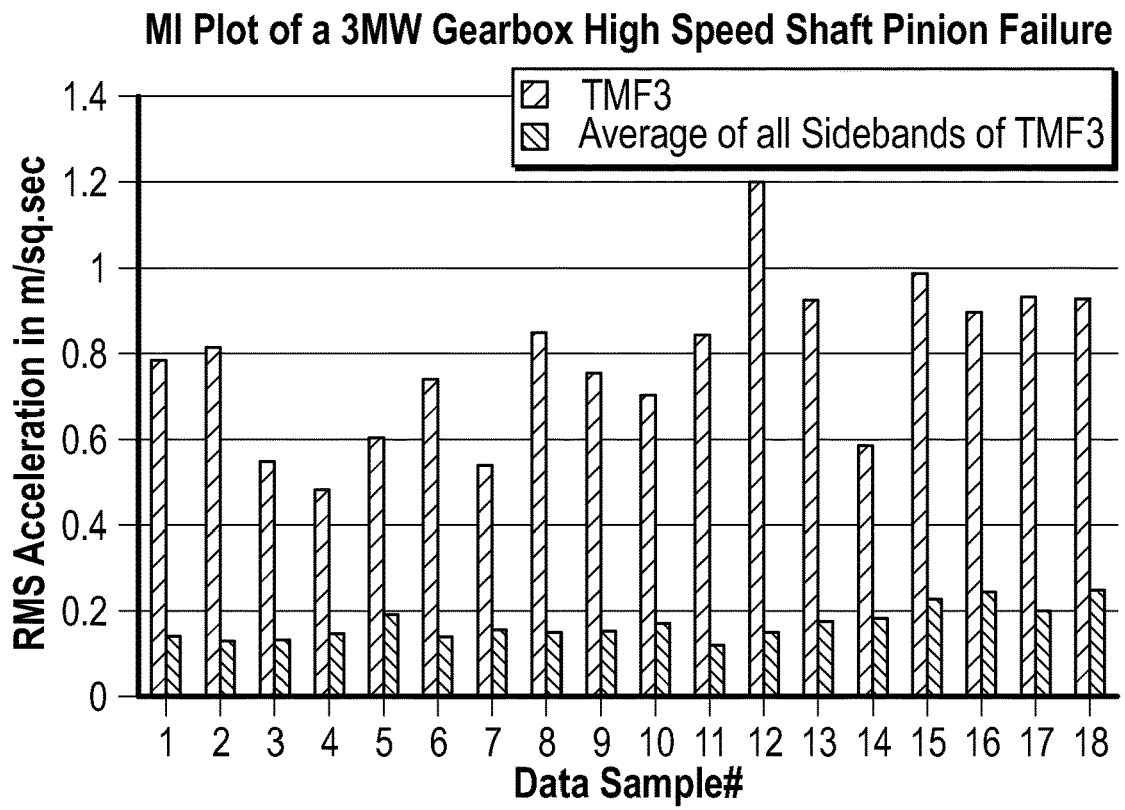
FIG. 7 shows an MI trend plot for a further centre harmonic frequency amplitude of a system of gears according to a first specific implementation of the invention.

FIGS. 5, 6 and 7 show MI trend plots. The X-axis and Y-axis represent sample number and vibration acceleration values respectively. In this specific example RMS acceleration was used, however peak acceleration or another appropriate quantity may be used.

Sample number in this example represents CMS data files, chosen to represent the fault progression. The decrease in gap between amplitudes of tooth mesh frequency and average of sidebands are proportionate with gear defect progression. This is clearly evident in the MI trend plot of 2nd TMF shown in FIG. 6. The gap reduces as the gear heads towards failure.

With reference to FIG. 5, each sample number represents an iteration in the method embodying the present invention described above. Controller 104 obtains a fundamental tooth mesh frequency (TMF1) amplitude 501 at step 204 for the first time (i.e. the first iteration). This is represented in the figure as the left hand bar against sample number 1. The controller 104 then obtains six sideband amplitudes on either side of TMF1 and calculates their average value at steps 205 and 206. The average sideband amplitude 502 is represented in the figure at the right hand bar against sample number 1.

At this point in time, there is no fault in the system of gears 102. As a result the modulation of the TMF1 amplitude is small. Thus, the TMF1 amplitude 501 is large relative to the average sideband amplitude 502.

The controller then calculates the MI at step 207. This value is below the threshold (as the TMF1 amplitude is large compared to the average sideband amplitude 502), and as such the controller repeats the process.

As can be seen from FIG. 5, the controller 104 repeats the process 18 times, calculating 18 values of TMF1 and the corresponding average sideband amplitudes, and MI values over time. The values of the amplitudes are plotted on the same graph for comparison. As can be seen, over the period at the method is run, a fault develops in the system of gears 102. There is a marked rise in the value of the average sideband amplitudes which corresponds to an increase in the value of the MI over the same period.

This process is then repeated for TMF2 and TMF3. The analysis in relation to TMF2 displays an even more striking representation of the gear fault progression, as can be seen in FIG. 6. This figure is equivalent to that described above, with the exception that the data relates to the TMF2 amplitude and its side bands.

Figure 8:
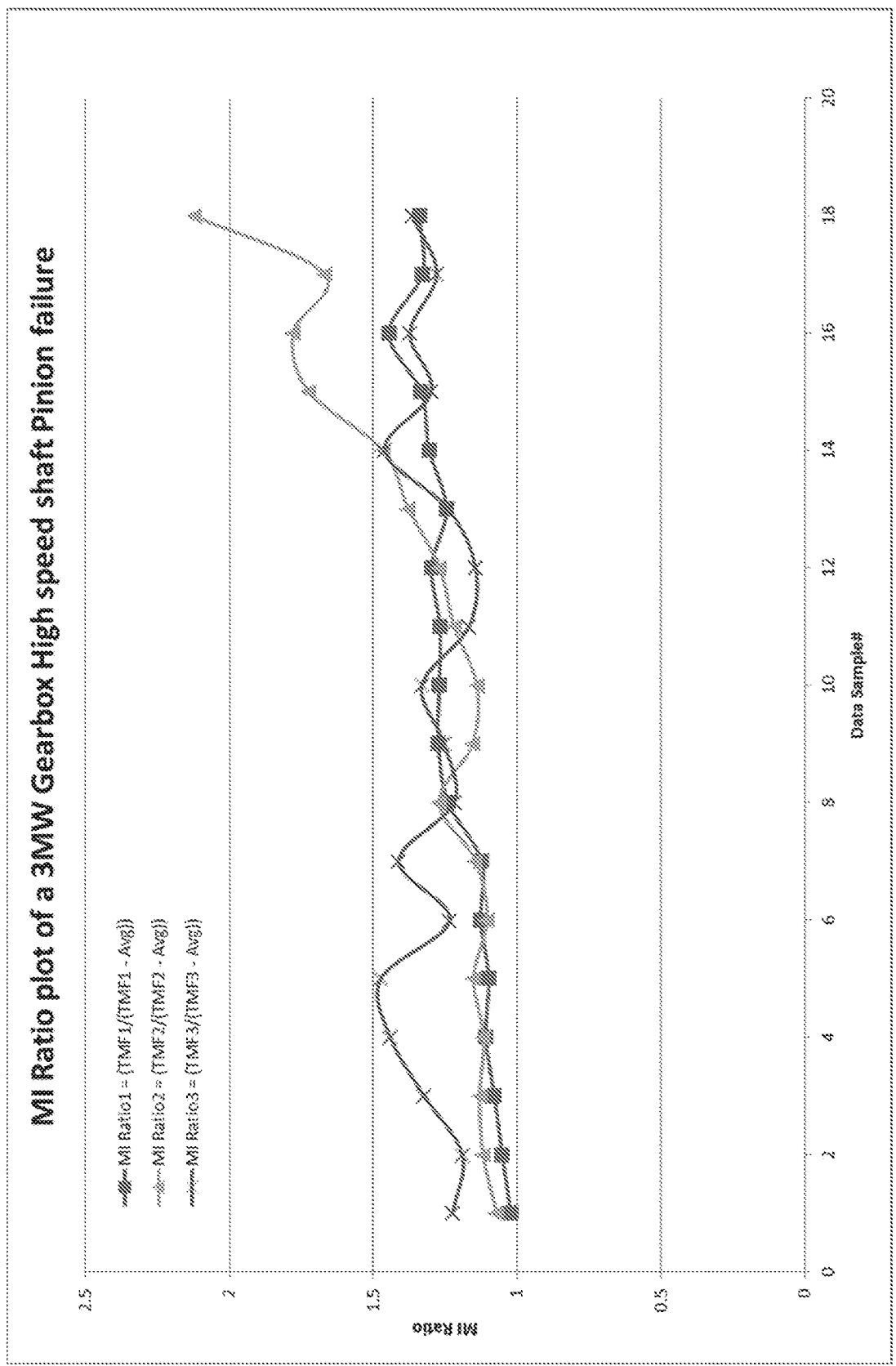
FIG. 8 shows an MI ratio trend plot for three centre harmonic frequencies of a system of gears according to a first specific implementation of the invention.

The controller 104 may then plot the calculated MI ratios for TMF1, TMF2 and TMF3 respectively on a single graph, as shown in FIG. 8. This allows easy analysis of gear fault progression. FIG. 8 shows that for this particular gear mesh fault, TMF2 provides the clearest indication of gear fault progression.

This information may be output to the display 105, along with the MI values and any recommendations for an operator to view.

Specific Example 2: Pinion Tooth Crack in a 2 MW Gearbox

The gearbox in this example case study is a three-stage, one planetary and two parallel stage, helical unit configuration with gear ratio 1:112.24 (Step—up). The nominal HSS speed is 1553 RPM and the nominal torque at HSS is 21 kNm. An intermediate pinion tooth crack occurred at the end of the test due to fatigue failure.

TABLE 2

Summary of the Gearbox shaft speeds and TMF of 1.8 MW gearbox

| Description | No of Teeth | RPM | Hz | Stage |
|---|---|---|---|---|
| Carrier (Input) | | 14.94 | 0.25 | P |
| Ring Gear (stationary) | 95 | 0.00 | 0.00 | |
| Planet | 37 | 38.34 | 0.64 | |
| Sun Pinion (Output) | 19 | 89.58 | 1.493 | |
| Gear wheel | 84 | 89.58 | 1.493 | IS |
| Output Pinion | 22 | 342.06 | 5.70 | |
| Gear Wheel | 109 | 342.06 | 5.70 | HS |
| Pinion (Output) | 24 | 1553.40 | 25.89 | |
| Gear Ratio of P | | | 6.00 | |
| Gear Ratio of IS | | | 3.8100 | |
| Gear Ratio of HS | | | 4.5400 | |
| TMF and its harmonics | P in Hz | IS in Hz | HS in Hz | |
| 1XTMF | 23.65 | 125.4121 | 621.3600 | |
| 2XTMF | 47.30 | 250.82 | 1242.72 | |
| 3XTMF | 70.95 | 376.24 | 1864.08 | |

The summary of gearbox shaft speeds and TMF of a 2 MW gearbox are tabulated in Table 2. Further, TMF and its harmonics of the planetary, intermediate and high speed stage and their corresponding shaft speeds are presented in Table 2 and are referred to in this section.

Figure 9:
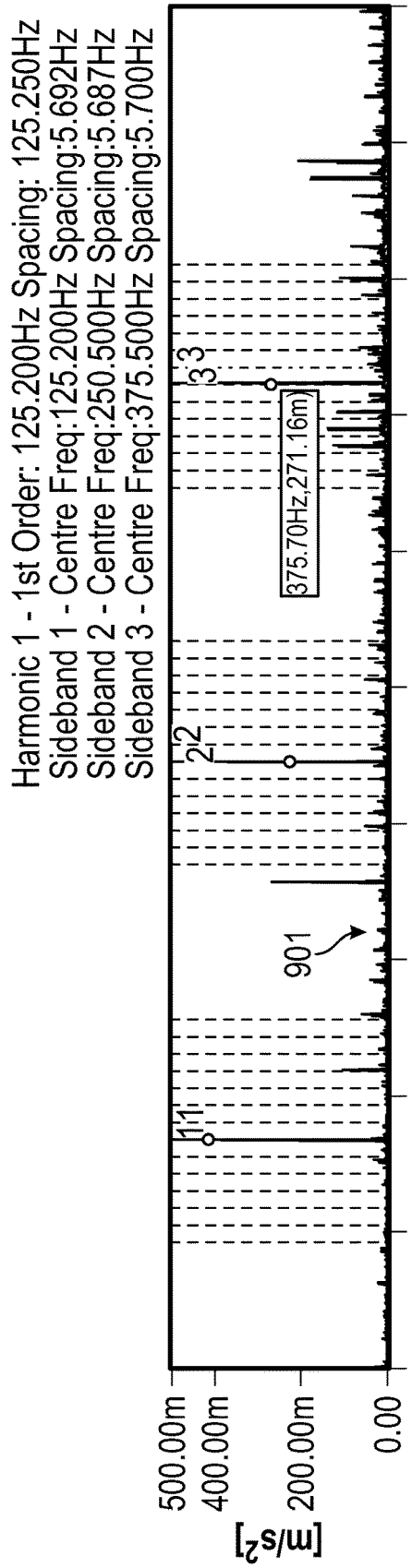
FIG. 9 shows a fast Fourier transform spectrum of a healthy system of gears according to a second specific implementation of the invention.

FIG. 9 shows that a FFT Spectrum 901 of a healthy gear mesh has 1× & 2×TMF and its harmonics along with sidebands spaced at IMS revolution. As the FFT spectrum 901 is of a healthy gear mesh, the sideband energy levels around 1× & 2×TMF are observed to be small.

As described above, a time waveform of a healthy gear may have no periodic impact spikes for Intermediate Speed (IMS) shaft revolutions. The CF value for the healthy gear in this example was 4.38.

Figure 10:
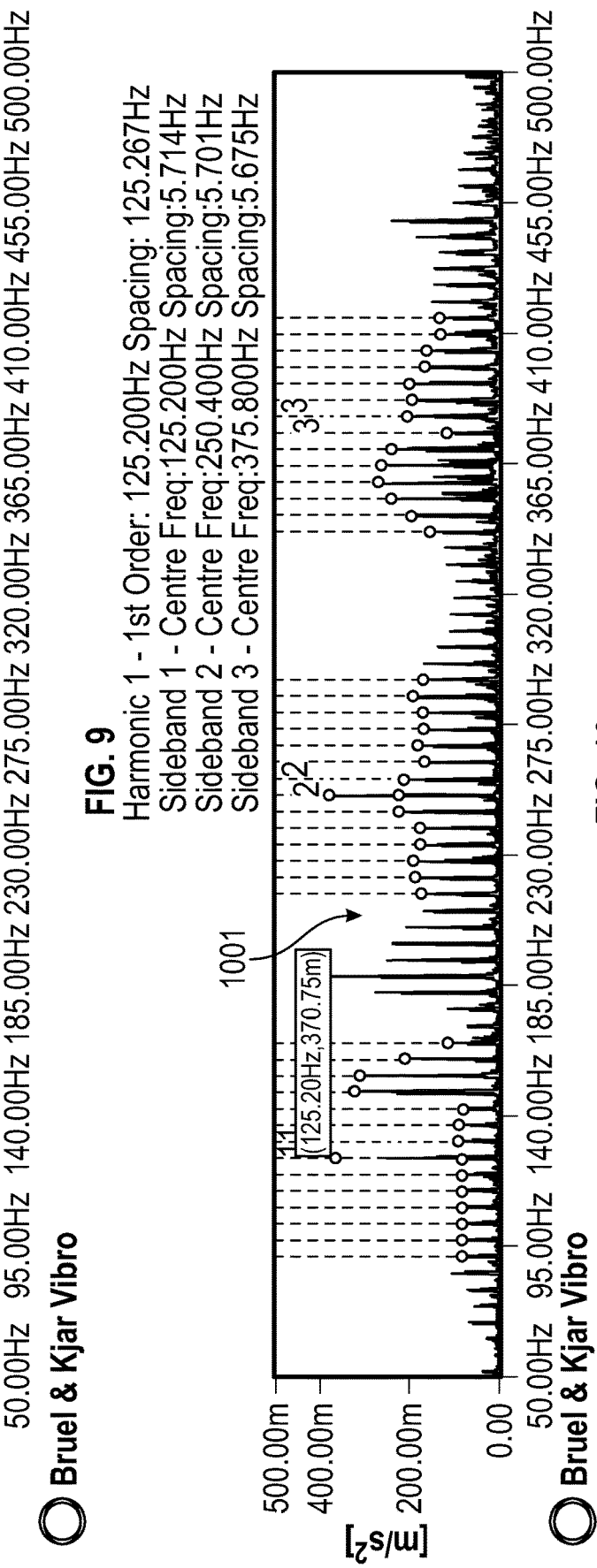
FIG. 10 shows a fast Fourier transform spectrum of a faulty system of gears according to a second specific implementation of the invention.

FIG. 10 shows a FFT spectrum 1001 for a faulty gear mesh. The FFT spectrum 1001 has a 1×TMF of IMS and harmonics, with sidebands spaced at IMS running speed that indicate IMS pinion damage.

The presence and spacing of the sidebands around 1×, 2× & 3×TMF in the spectra indicate that sideband modulation is occurring once per turn of the IMS. Also, the fact that the 1×, 2× centre mesh frequencies belong to the IS gear mesh indicates that the damage causing the modulation passes through that mesh. From this information we can diagnose that there is damage to the intermediate pinion in this gearbox.

A time waveform of the faulty gear in this example had a CF value of 7.22. Further the time waveform had periodic impact spikes that were clearly visible throughout the time waveform window. There may be a significant difference between a healthy gear mesh and faulty gear mesh time waveform as amplitude modulations are evident. This is a confirmation of the gear defect along with FFT spectra.

Figure 11:
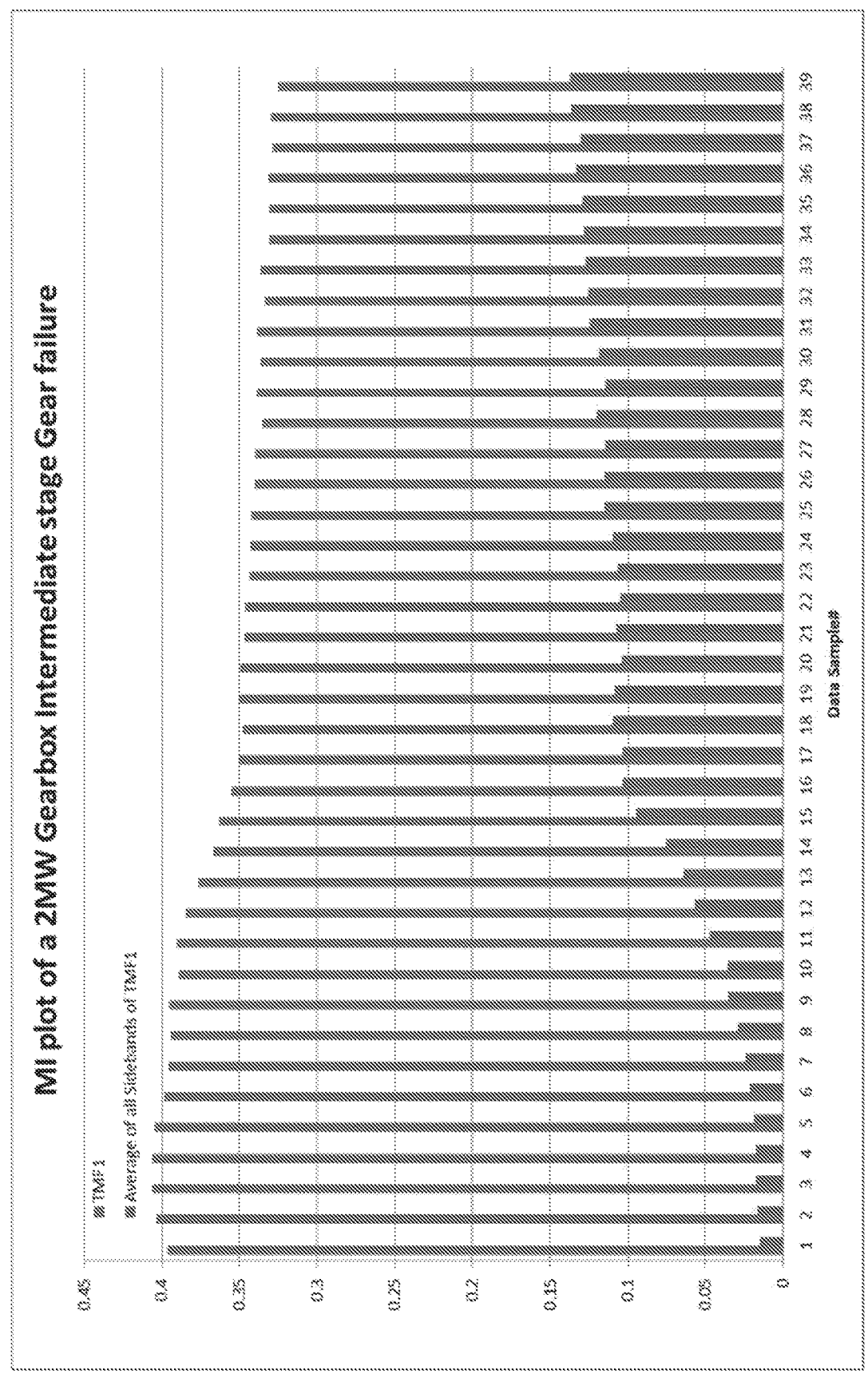
FIG. 11 shows an MI trend plot for a first centre harmonic frequency amplitude raw time waveform of a healthy system of gears according to a second specific implementation of the invention.
Figure 12:
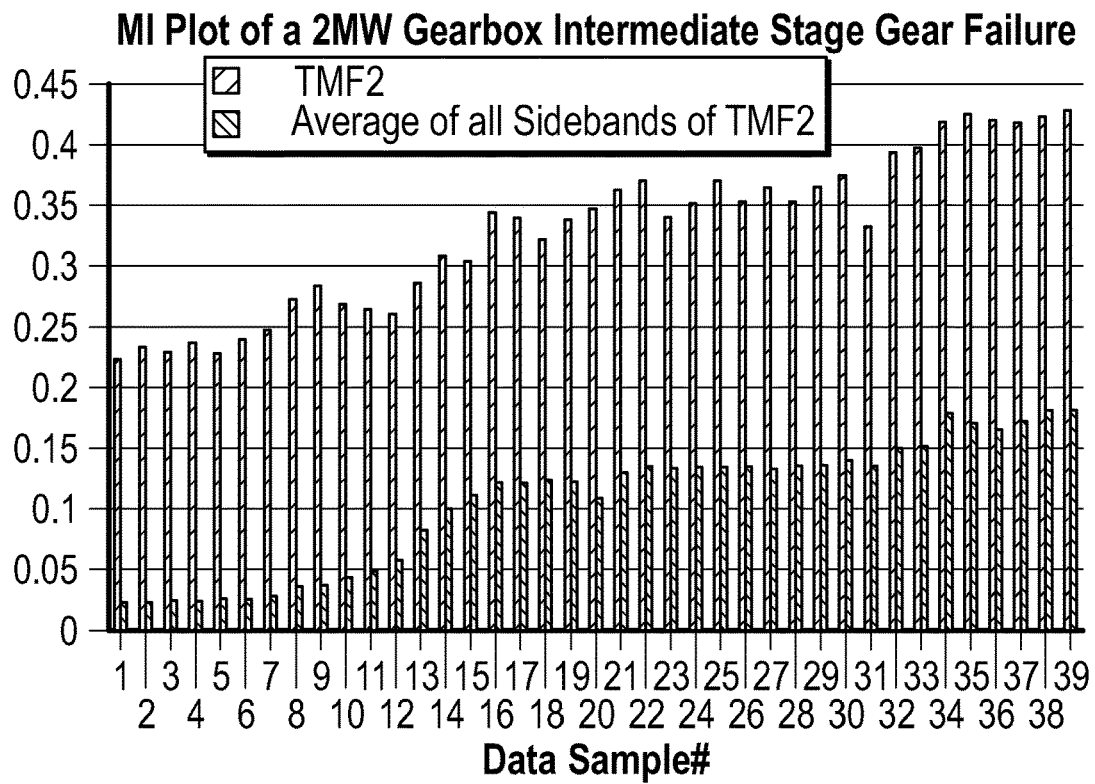
FIG. 12 shows an MI trend plot for a second centre harmonic frequency amplitude raw time waveform of a healthy system of gears according to a first specific implementation of the invention.
Figure 13:
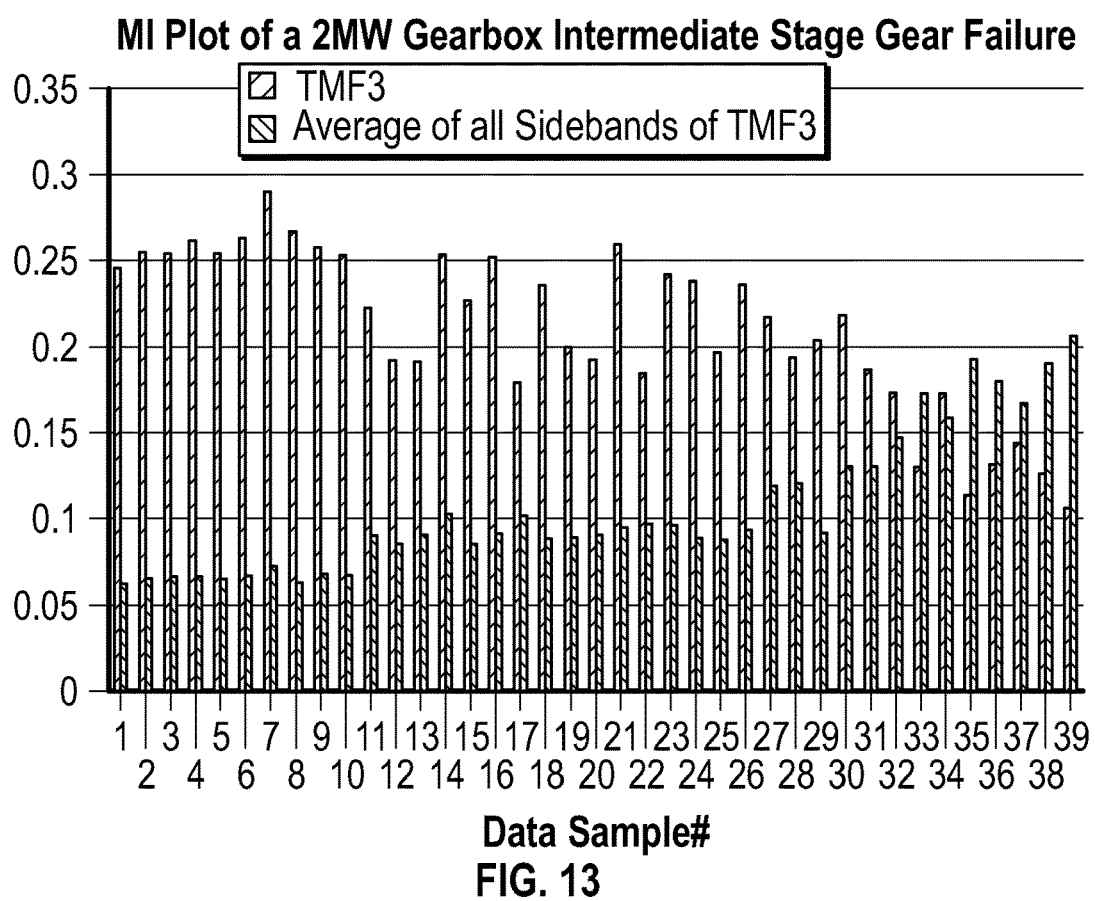
FIG. 13 shows an MI trend plot for a further centre harmonic frequency amplitude raw time waveform of a healthy system of gears according to a first specific implementation of the invention.

In FIGS. 11, 12 and 13, the X-axis and Y-axis represent sample number and MI values respectively. Sample number in this example represents CMS data files, chosen to represent the fault progression, under the same operating conditions used for MI trend comparison. The decrease in gap between tooth mesh frequency and average of sidebands are proportionate with gear defect progression, as is clearly evident in the MI Trend plot for all TMF harmonics.

Figure 14:
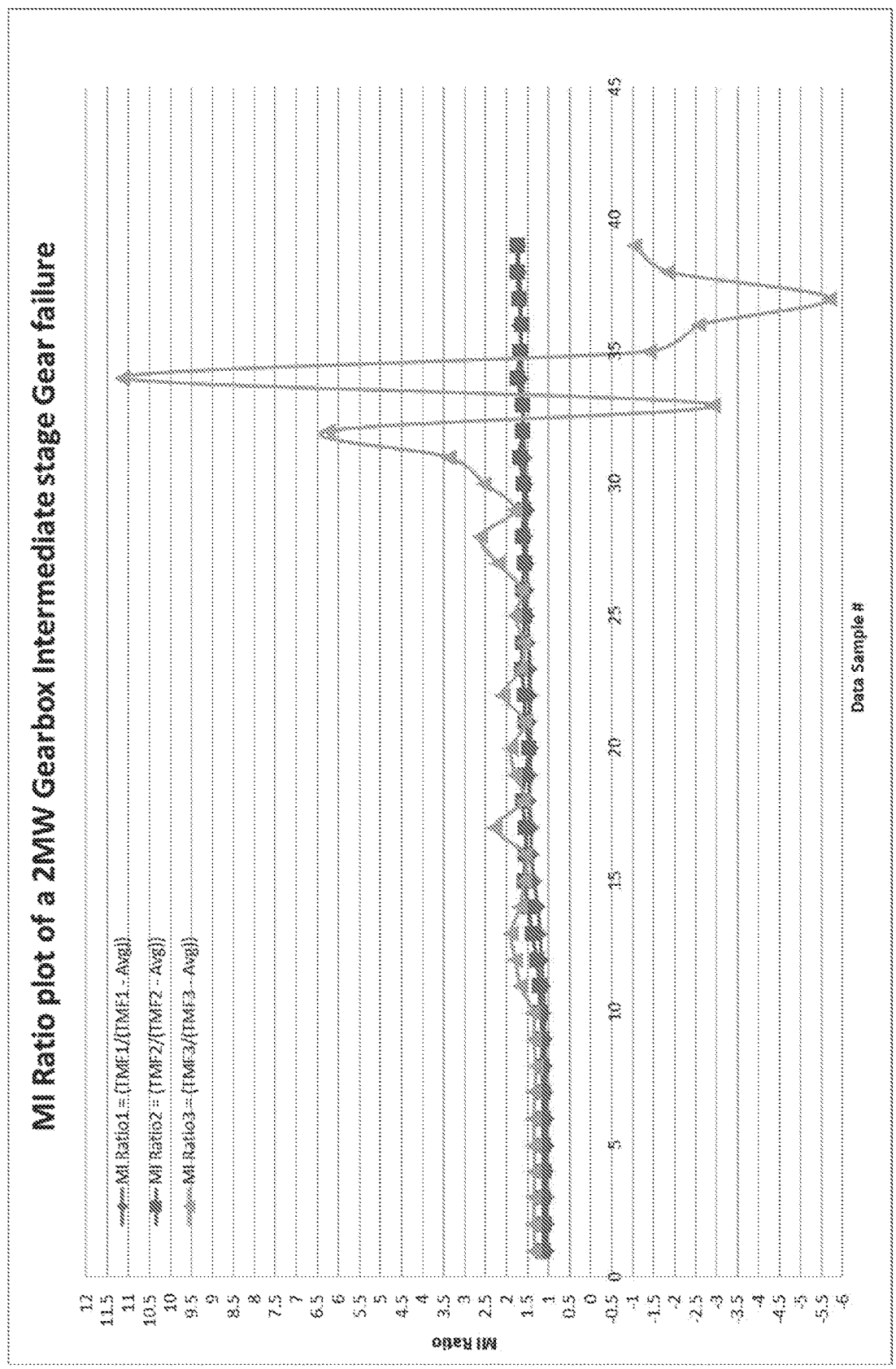
FIG. 14 shows an MI ratio trend plot for three centre harmonic frequencies of a system of gears according to a first second specific implementation of the invention.

In FIG. 14, the MI ratios for TMF1, TMF2 and TMF3 are plotted respectively on a single graph. This allows easy analysis of gear fault progression.

The information contained in these figures may be obtained and used in an identical manner as that described with respect to FIGS. 5-8.

Whilst the invention has been described primarily in relation to a wind turbine controller, embodiments can be implemented on any appropriate computing device or platform.

Embodiments of the invention may include a wind turbine, or wind park, controller configured to adjust one or more operating parameters of a wind turbine based upon the output of any of the methods described herein. In particular, the controller may shut down, or reduce power generated by, a wind turbine when the method output indicates damage has occurred. This may be implemented using one or more thresholds applied to one or more of the MI ratios for respective harmonics, for example, whereby when the threshold is passed or exceeded by a particular MI ratio, action is taken by the controller to limit or prevent further damage to the gear components.

The invention claimed is:

1. A method of identifying a fault in a system of gears in a wind turbine, the method comprising:
   receiving, from a sensor of the wind turbine, vibrational data indicating vibrations of the system of gears;
   determining a first center harmonic frequency amplitude of the vibrational data;
   determining a plurality of sideband amplitudes of the first center harmonic frequency amplitude;
   calculating an average sideband amplitude from the plurality of sideband amplitudes;
   determining a value indicative of damage incurred by the system of gears based upon a difference between the first center harmonic frequency amplitude and the average sideband amplitude; and
   generating a signal indicating a fault in the system of gears when the value exceeds a threshold value.

2. The method according to claim 1, wherein the method further comprises:
- determining one or more additional center harmonic frequency amplitudes of the vibrational data;
- determining a plurality of sideband amplitudes of each of the additional center harmonic frequency amplitudes;
- calculating an average sideband amplitude of each of the additional center harmonic frequency amplitudes; and
- determining a value indicative of damage incurred by the system of gears based upon each of the additional center harmonic frequency amplitudes and the associated average sideband amplitude of each additional center harmonic frequency amplitude.

3. The method according to claim 2,
- wherein the system of gears is a multi-stage system of gears,
- wherein each center harmonic frequency amplitude is correlated to a mesh between respective gears; and
- wherein the center harmonic frequency amplitudes are center harmonic tooth mesh frequency amplitudes, the method further comprising:
  - identifying the fault as occurring within a particular mesh of gears within the system of gears based upon the value indicative of damage for the corresponding center harmonic frequency amplitude.

4. The method according to claim 2, wherein each of the additional center harmonic frequency amplitudes is a respective harmonic of the first frequency amplitude.

5. The method according to claim 1, wherein the center harmonic frequency amplitude is a harmonic tooth mesh frequency amplitude.

6. The method according to claim 1, wherein the first center harmonic frequency amplitude is at a fundamental harmonic frequency for the system of gears.

7. The method according to claim 1, wherein determining the value comprises:
- calculating a ratio of (i) the center harmonic frequency amplitude and (ii) the difference between the center harmonic frequency amplitude and the average sideband amplitude, or vice versa.

8. The method according to claim 7, wherein the ratio is compared to the threshold value to identify whether the fault is present in the system of gears.

9. The method according to claim 7, further comprising:
- repeatedly calculating the ratio while the ratio is less than the threshold value to obtain a plurality of ratio values.

10. The method according to claim 7, comprising:
- identifying the fault as occurring within a particular mesh of gears within the system of gears when the ratio for a particular center harmonic frequency amplitude associated with the particular mesh of gears exceeds the threshold value.

11. The method according to claim 7, further comprising:
- repeatedly calculating the ratio for a predetermined period of time to obtain a plurality of ratio values.

12. The method according to claim 7, further comprising:
- calculating a plurality of ratio values that are used to track the progression of the fault.

13. The method according to claim 12, wherein tracking the fault comprises:
- comparing each successively calculated ratio value with a threshold value.

14. The method according to claim 12, wherein tracking the fault comprises:
- comparing each ratio value of the plurality of ratio values with one or more other ratio values of the plurality of ratio values.

15. The method according to claim 1, wherein at least six sideband amplitudes on either side of the first center harmonic frequency amplitude are used to calculate the average sideband amplitude.

16. The method according to claim 1, further comprising:
- controlling the wind turbine responsive to the fault.

17. A controller for controlling a wind turbine, the controller being configured to perform an operation of identifying a fault in a system of gears in the wind turbine, the operation comprising:
- determining a first center harmonic frequency amplitude according to vibrational data indicating vibrations of the system of gears;
- determining a plurality of sideband amplitudes of the first center harmonic frequency amplitude;
- calculating an average sideband amplitude from the plurality of sideband amplitudes; and
- determining a value indicative of damage incurred by the system of gears based upon a difference between the first center harmonic frequency amplitude and the average sideband amplitude.

18. A wind turbine, comprising:
- a tower;
- a nacelle disposed on the tower;
- a rotor extending from the nacelle;
- a system of gears coupled to one end of the rotor; and
- a controller configured to:
  - determine a first center harmonic frequency amplitude according to vibrational data indicating vibrations of the system of gears;
  - determine a plurality of sideband amplitudes of the first center harmonic frequency amplitude;
  - calculate an average sideband amplitude from the plurality of sideband amplitudes; and
  - determine a value indicative of damage incurred by the system of gears based upon a difference between the first center harmonic frequency amplitude and the average sideband amplitude.

19. The wind turbine according to claim 18, wherein the controller is further configured to:
- determine one or more additional center harmonic frequency amplitudes;
- determine a plurality of sideband amplitudes of each of the additional center harmonic frequency amplitudes;
- calculating an average sideband amplitude of each of the additional center harmonic frequency amplitudes; and
- determining a value indicative of damage incurred by the system of gears based upon each of the additional center harmonic frequency amplitudes and the associated average sideband amplitude of each additional center harmonic frequency amplitude.

20. The wind turbine according to claim 18, wherein the center harmonic frequency amplitude is a harmonic tooth mesh frequency amplitude.

\* \* \* \* \*